US005609406A

United States Patent [19]

Cejnek

[11] Patent Number: 5,609,406

[45] Date of Patent: Mar. 11, 1997

[54] HEADLAMP FOR MOTOR VEHICLES

[75] Inventor: Milan Cejnek, Nový Jiöfn, Czech Rep.

[73] Assignee: AUTOPAL s.r.o., Novy Jicin, Czech Rep.

[21] Appl. No.: 313,066

[22] PCT Filed: Dec. 16, 1993

[86] PCT No.: PCT/CZ93/00030

§ 371 Date: Nov. 17, 1994

§ 102(e) Date: Nov. 17, 1994

[87] PCT Pub. No.: WO94/17326

PCT Pub. Date: Aug. 4, 1994

[30] Foreign Application Priority Data

Jan. 25, 1993 [CZ] Czech Rep. .................................. 72-93
Dec. 16, 1993 [WO] WIPO .......................... PCT/CZ93/0030

[51] Int. Cl.[6] ........................................................ B60Q 1/04

[52] U.S. Cl. ............................ 362/61; 362/298; 362/299; 362/351; 362/328

[58] Field of Search .............................. 362/61, 268, 298, 362/299, 346, 301, 308, 302, 352, 328, 329, 300, 80

[56] References Cited

U.S. PATENT DOCUMENTS

| | | | |
|---|---|---|---|
| 5,021,930 | 6/1991 | Yamada | 362/61 |
| 5,156,445 | 10/1992 | Sato | 362/61 |
| 5,199,779 | 4/1993 | Sato | 362/61 |
| 5,258,686 | 11/1993 | Segoshi et al. | 362/61 |
| 5,307,247 | 4/1994 | Cejnek | 362/61 |

FOREIGN PATENT DOCUMENTS

| | | |
|---|---|---|
| 2663716 | 12/1991 | France . |
| 9000395 | 6/1991 | Germany . |
| 2253046 | 8/1992 | United Kingdom . |

*Primary Examiner*—Ira S. Lazarus
*Assistant Examiner*—Thomas M. Sember
*Attorney, Agent, or Firm*—Beveridge, DeGrandi, Weilacher & Young, L.L.P.

[57] ABSTRACT

The headlamp is of the projection design and comprises a reflector (1), a light source (2), a screen (3) and a lens (4). An aperture reflector (5) is situated below the headlamp axis (12) between the lens (4) and the refractor (6). The aperture reflector (5) has a reflective surface (51) which is inclined in a vertical plane to the headlamp axis (12) at an angle α, which together with the length (L), determines the intensity and geometry of the light beam above the horizontal axis in the vertical direction. The transverse dimension of the light beam above the horizontal is determined by the radial cambering of the reflective surface (51) of the aperture reflector (5) of radius ($R_x$) and width (S) and/or by reflexive elements (52) on this reflective surface (51). The refractor (6) is provided with optical means with transverse and/or vertical deviation in a zone (61) which covers the aperture reflector (5) and the bottom part of the lens (4).

10 Claims, 1 Drawing Sheet

HEADLAMP FOR MOTOR VEHICLES

FIELD OF THE ART

The invention relates to a headlamp of a projection type for motor vehicles which has increased intensity of illumination above the light-darkness boundary of the headlamp dipped beam or the fog light beam.

STATE OF THE ART

In the usual elliptic dioptric headlamps comprising an integrating reflector, a screen, a lens and a refractor, the lens redistributes the light beam of the reflector so that it is nearly perfectly concentrated below the horizontal, while above it the intensity of illumination is minimal, with the exception of an asymmetric cut-off of the dipped beam. As a consequence, oncoming drivers are much less distracted, but on the other hand inadequate illumination reduces readability of vertical traffic signs which have a relatively low level of surface brightness if illuminated by dimmed headlamps. The low intensity of illumination above the light-darkness boundary makes orientation for the driver in the upper part of his working space impossible. This can have an adverse effect while driving on unlit twisting rural roads, especially in the absence of outline vision provided from the lights of oncoming vehicles.

EMBODIMENT OF THE INVENTION

The above drawbacks are eliminated by a headlamp according to the invention which comprises a concave reflector integrating the light coming from the light source. In front of the reflector is situated a screen which limits and shapes the upper part of the dipped light beam or fog beam and a lens which projects the contrast of the brightness of the dark screen-shaded area on the light background of the reflector onto the road. Below the headlamp axis between the lens and the refractor, is situated an aperture reflector, the upper edge of which is the reflecting surface which is vertically placed between the headlamp axis and the operational diameter of the lens and is approximately parallel to the headlamp axis.

The light beam, coming originally from the light source and reflector, is projected by the lens downwards, but after reflection by the reflective surface of the aperture reflector, it is directed upwards above the horizontal. The image of the light beam of the aperture reflector is vertically shaped by the length and inclination of the reflective surface of the aperture reflector. Lateral spread of this light beam is achieved by a suitable radial profile of the reflective surface of the aperture reflector in the transverse direction and/or by application of reflective elements with transversal light diffusion on this reflective surface. Both vertical and transverse distribution of the light beam intensity of illumination above the horizontal can be modified by optical means in the zone of the headlamp refractor, which if seen in the front view, covers the lower part of the lens with the aperture reflector and has a transverse and/or vertical deviation effect on the light beam coming from the aperture reflector. This ensures optimum luminous intensity above the light-darkness boundary both with regard to dazzling and illumination.

Visibility of the vertical traffic signs, of possible obstacles, and pedestrians; orientation while driving on roads which are not illuminated; and, also, signalization of the position and movement of the front part of the driver's own vehicle for other participants in road traffic are improved.

BRIEF DESCRIPTION OF THE DRAWINGS

An example of a headlamp according to the invention is shown in the accompanying drawings, in which.

PREFERRED EMBODIMENT OF THE INVENTION

Figure 1:
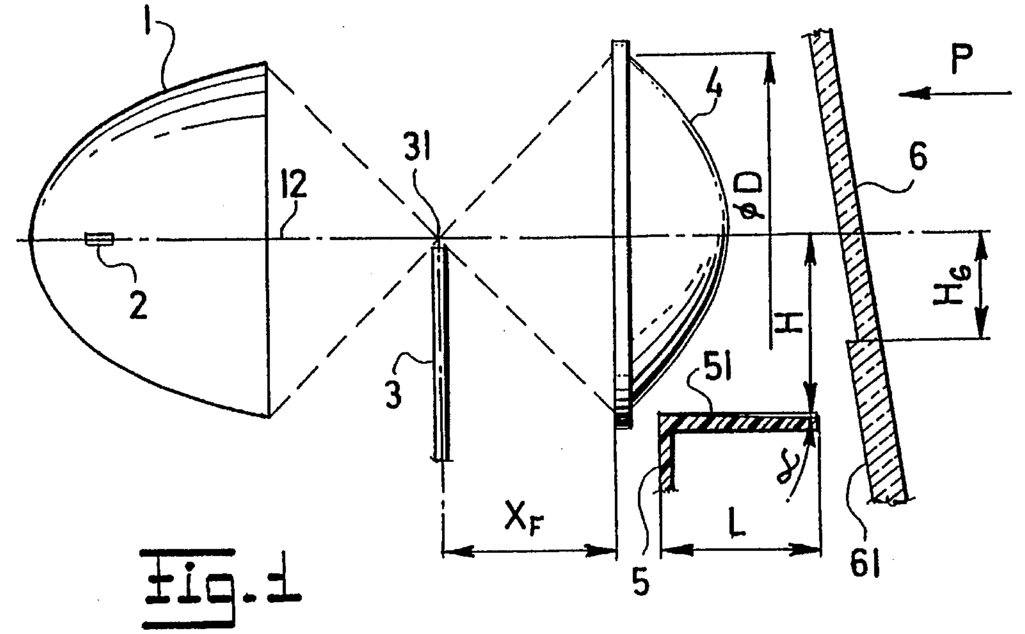
FIG. 1 is a vertical section through a headlamp along the line A—A.

FIG. 1 shows a concave reflector 1 with a light source 2 placed in proximity of its axis 12 that forms the headlamp axis. The light source 2 is a transversally or axially situated body of approximately cylindrical shape, e.g. a helical filament of a lamp or the arc of a discharge lamp. Downstream of the reflector 1 is a screen 3 having a cut-off edge 31 in the proximity of the headlamp axis 12. At a distance $x_F$ from the screen 3 is situated a lens 4 which has a diameter D and collimates the light coming from the reflector 1.

In front of the lens 4 at a distance H $$H=(0.15 \text{ to } 0.6).D \tag{1}$$

below the axis 12 is the reflective surface 51 of the aperture reflector 5. As the distance H is decreased the level of illumination above the horizontal line and the width of the light image are increased, while the total illumination effectiveness is decreased. The inclination $\alpha$ of the reflective surface 51 of the aperture reflector 5 determines the height position of the light image above the horizontal which covers the zones of possible dazzling area and is $$\alpha=0\pm7^\circ \tag{2}$$

The intensity of illumination and vertical geometry of the light beam are given by the length L of the reflective surface 51, which is $$L=(0.2 \text{ to } 0.7).x_F \tag{3}$$

In the zone 61 which includes the bottom part of the lens 4 and the aperture reflector 5 and which is spaced from the headlamp axis 12 by a distance $H_6$ $$H_6=(0.1 \text{ to } 0.9).H \tag{4}$$

the refractor 6 can be equipped with optical means that redistribute the light beam in the bottom headlamp part vertically and/or to the sides to obtain the optimum luminous intensity and geometry of the light beam in the upper half-space.

Figure 2:
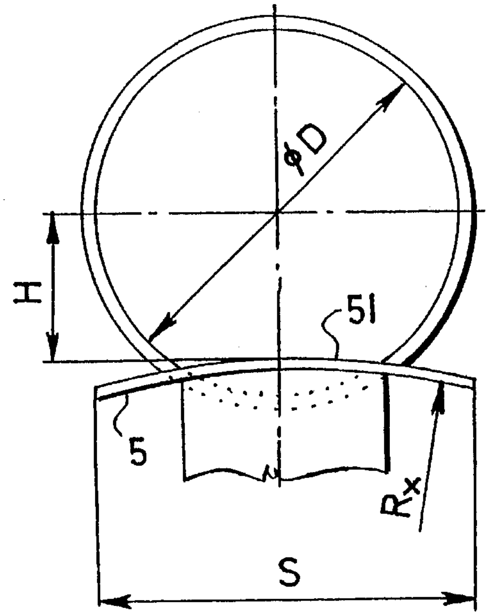
FIG. 2 is a front elevation in the direction P of the headlamp without a refractor.
Figure 3:
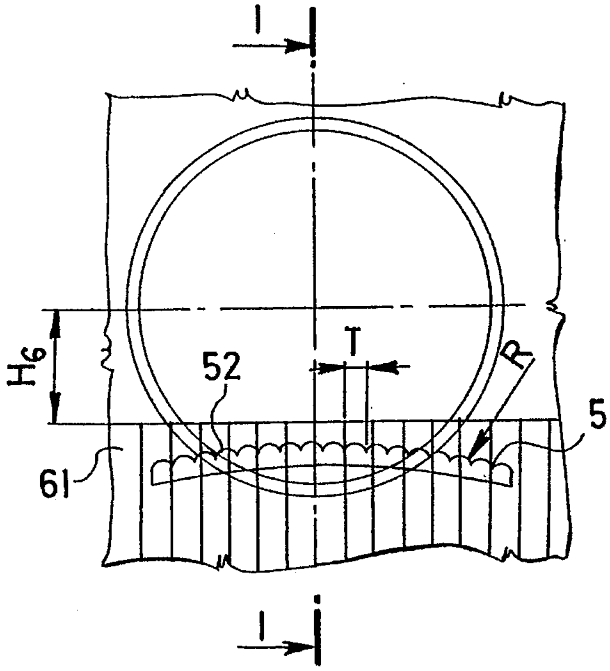
FIG. 3 is the same view as in FIG. 2 but with a refractor.

FIGS. 2 and 3 show the front view of the lens 4 of diameter D and the zone 61 of the refractor 6 which is spaced at a distance $H_6$ from the headlamp axis 12. The aperture reflector 5 has a width S $$S=(0.1 \text{ to } 0.7).(3D-H) \quad (5)$$

which increases with decreasing distance H in the same way as the light beam width above the horizontal.

The reflective surface 51 of the aperture reflector 5 is planar, or to obtain the desired transverse (lateral) dimension of the light beam above the horizontal, it is radially cambered with a radius $R_x$ $$R_x=(2 \text{ to } \infty).S \quad (6)$$

and/or provided with the reflective strip elements 52 having a width T and a radius R, where $$\frac{T}{R}=0.01 \text{ to } 0.4 \quad (7)$$

The above described arrangement increases the level of illumination in the upper half-space to an extent which improves the rate and probability of recognition of vertical traffic signs and driver's orientation during driving, but the illumination is at such a level which does not inconvenience the drivers in oncoming traffic by psychological to physiological dazzling.

Industrial Application

The headlamp according to the invention is applicable in vehicles operated on roads.

I claim:

1. A projection type headlamp for a motor vehicle comprising a concave reflector;

a light source within said concave reflector, said light source and said concave reflector providing a beam of light projected outwardly along an axis from said light source;

a screen spaced from said concave reflector and below said axis and preventing passage of a portion of the light provided by said light source and said concave reflector;

a lens having a diameter (D) spaced at a distance $X_F$ from said screen;

an aperture reflector spaced from a front of a lower portion of said lens and extending outwardly from said lens, said aperture reflector having a reflective surface, said reflective surface being spaced from said axis by a distance (H) wherein $$H=(0.15 \text{ to } 0.6) * D,$$

said reflective surface being inclined with respect to said axis at an angle (α) wherein $$\alpha=0\pm7°, \text{ and}$$

said reflective surface having a length (L) wherein $$L=(0.2 \text{ to } 0.7) * X_F; \text{ and}$$

a refractor spaced forwardly from said lens to receive light reflected upwardly from said reflective surface, said refractor defining a zone encompassing said aperture reflector and said lower portion of said lens, said zone being spaced from said axis by a distance ($H_6$) wherein $$H_6=(0.1 \text{ to } 0.9) * H,$$

said zone providing at least one of lateral and vertical deviation of the beam of light provided by said light source and said concave reflector.

2. Headlamp according to claim 1, characterized in that the reflective surface (51) of the aperture reflector (5) is planar.

3. Headlamp according to claim 2, characterized in that the reflective surface (51) of the aperture reflector (5) is provided with reflective strip elements (52) of a width (T) and radius (R), where $$\frac{T}{R}=0.01 \text{ to } 0.4. \quad (7)$$

4. Headlamp according to claim 1, characterized in that the reflective surface (51) has a width (S)

$$S=(0.1 \text{ to } 0.7).(3D-H) \quad (5)$$

and is radially cambered with a radius ($R_x$)

$$R_x=(2 \text{ to } \infty).S. \quad (6)$$

5. Headlamp according to claim 4, characterized in that the reflective surface (51) of the aperture reflector (5) is provided with reflective strip elements (52) of a width (T) and radius (R), where $$\frac{T}{R}=0.01 \text{ to } 0.4. \quad (7)$$

6. Headlamp according to claim 1, characterized in that the reflective surface (51) of the aperture reflector (5) is provided with reflective strip elements (52) of a width (T) and radius (R), where $$\frac{T}{R}=0.01 \text{ to } 0.4. \quad (7)$$

7. A projection type headlamp for a motor vehicle comprising a concave reflector, a light source within said concave reflector, said light source and said concave reflector providing a beam of light projected outwardly along an axis from said light source, a screen spaced from said concave reflector and below said axis and preventing passage of a portion of the light emitted by said light source and said concave reflector, a lens having a diameter (D) spaced at a distance $X_F$ from said screen, an aperture reflector spaced from a front of a lower portion of said lens and extending outwardly from said lens, said aperture reflector having a reflective surface, said reflective surface being spaced from said axis by a distance (H) wherein $$H=(0.15 \text{ to } 0.6) * D,$$

said reflective surface being inclined with respect to said axis at an angle (α) wherein $$\alpha=0\pm7°, \text{ and}$$

said reflective surface having a length (L) wherein $$L=(0.2 \text{ to } 0.7) * X_F; \text{ and}$$

a refractor spaced forwardly from said lens to receive light reflected upwardly from said reflective surface.

8. Headlamp according to claim 7, characterized in that the reflective surface (51) of the aperture reflector (5) is planar.

9. Headlamp according to claim 7, characterized in that the reflective surface (51) has a width (S)

$$S=(0.1 \text{ to } 0.7).(3D-H) \quad (5)$$

and is radially cambered with a radius ($R_x$)

$$R_x=(2 \text{ to } \infty).S. \quad (6)$$

10. Headlamp according to claim 7, characterized in that the reflective surface (51) of the aperture reflector (5) is provided with reflective strip elements (52) of a width (T) and radius (R), where $$\frac{T}{R} = 0.01 \text{ to } 0.4. \quad (7)$$

* * * * *